US012508718B2

(12) United States Patent
Krejci

(10) Patent No.: US 12,508,718 B2
(45) Date of Patent: Dec. 30, 2025

(54) AUTONOMOUS FLOOR PLANNING AND INSTALLATION SYSTEM

(71) Applicant: Anthony Krejci, Detroit, MI (US)

(72) Inventor: Anthony Krejci, Detroit, MI (US)

( * ) Notice: Subject to any disclaimer, the term of this patent is extended or adjusted under 35 U.S.C. 154(b) by 134 days.

(21) Appl. No.: 18/514,366

(22) Filed: Nov. 20, 2023

(65) Prior Publication Data
US 2024/0335953 A1 Oct. 10, 2024

Related U.S. Application Data

(60) Provisional application No. 63/494,592, filed on Apr. 6, 2023.

(51) Int. Cl.
| | | |
|---|---|---|
| *B25J 11/00* | (2006.01) | |
| *B25J 5/00* | (2006.01) | |
| *B25J 19/02* | (2006.01) | |
| *E04F 15/00* | (2006.01) | |

(52) U.S. Cl.
CPC ........... *B25J 11/0055* (2013.01); *B25J 5/007* (2013.01); *B25J 19/021* (2013.01); *E04F 15/00* (2013.01)

(58) Field of Classification Search
CPC ...... B25J 11/0055; B25J 5/007; B25J 19/021; E04F 15/00
See application file for complete search history.

(56) References Cited

U.S. PATENT DOCUMENTS

| | | | |
|---|---|---|---|
| 5,859,783 A | 1/1999 | Ytterberg | |
| 8,381,473 B2 | 2/2013 | Scott | |
| 9,486,923 B2 | 11/2016 | Plachetka | |
| 10,501,943 B1 | 12/2019 | Peterson | |
| 2005/0010331 A1 | 1/2005 | Taylor | |
| 2007/0222274 A1* | 9/2007 | Manners | E04G 23/006 |
| | | | 299/36.1 |
| 2008/0175681 A1 | 7/2008 | Tataei | |
| 2023/0330894 A1* | 10/2023 | Gustafsson | B28D 1/045 |

FOREIGN PATENT DOCUMENTS

WO WO-2021240230 A1 * 12/2021

* cited by examiner

*Primary Examiner* — Harry Y Oh
(74) *Attorney, Agent, or Firm* — Brennan, Manna & Diamond, LLC

(57) ABSTRACT

An automated floor planning and installation system. The system includes an autonomous robot device equipped with sensors that measure floor surfaces and detect obstacles. The sensor data is transmitted to a floor planning control system, which generates a detailed floor plan, including dimensions, boundaries, and obstacle locations. The robot device incorporates a blade system that autonomously cuts the flooring material according to the floor plan, ensuring precise cuts without manual intervention. The floor plan can be stored in the robot device's memory, allowing for easy access during installation. In one embodiment, the system also provides recommendations for suitable flooring materials based on user preferences and requirements.

13 Claims, 7 Drawing Sheets

AUTONOMOUS FLOOR PLANNING AND INSTALLATION SYSTEM

CROSS-REFERENCE TO RELATED APPLICATION

The present application claims priority to, and the benefit of, U.S. Provisional Application No. 63/494,592, which was filed on Apr. 6, 2023 and is incorporated herein by reference in its entirety.

FIELD OF THE INVENTION

The present invention generally relates to the field of flooring systems and robot devices. More specifically, the present invention relates to a novel flooring installation system including an automated robot device with the ability to outline and measure flooring, and then cut it to size. There are one or more sensors integrated into the device that can measure flooring surfaces and detect permanent objects. The sensor data is sent to a computer for developing a floor plan. A utility blade in the robot is used to cut flooring to size. Accordingly, the present disclosure makes specific reference thereto. Nonetheless, it is to be appreciated that aspects of the present invention are also equally applicable to other like applications, devices, and methods of manufacture.

BACKGROUND

By way of background, flooring is crucial for the overall aesthetics and functionality of a space, whether it's a renovation project or a new construction. Choosing the right flooring material and ensuring its proper installation are important aspects of creating a visually appealing and durable floor surface. However, the process of installing flooring can be challenging, time-consuming, and physically demanding. Contractors or homeowners typically face several difficulties during the installation process. Firstly, accurate measurement of the flooring area is crucial to ensure proper fitting and minimize wastage. This often involves manually measuring the floor dimensions, which can be tedious and prone to errors. Manual measurements can result in incorrect calculations, leading to the purchase of excessive flooring material, resulting in wastage and increased costs and time.

Cutting the flooring material to the required size is another time-consuming task. Contractors often have to manually mark and cut the flooring pieces, which can be labor-intensive and require precision. Contractors or homeowners often have to spend long hours on their hands and knees, meticulously placing and securing each flooring piece. The entire flooring installation process can take several weeks to complete, further prolonging the project timeline and incurring higher labor costs. The extensive manual labor involved can result in increased expenses and potential delays. People desire an automated method for measurement and cutting system for flooring.

Therefore, there exists a long felt need in the art for an automated measurement and cutting system for flooring. Additionally, there is a long felt need in the art for an automated floor planning system that eliminates the need for people to bend, get on hands and knees in order to manually map out an entire floor plan. Moreover, there is a long felt need in the art for a flooring planning system that uses a robot device for measuring a floor, obstacles, and fixtures. Further, there is a long felt need in the art of a system that saves considerable time, money, and effort when installing flooring. Finally, there is a long felt need in the art for an innovative automated system that streamlines the flooring installation process, reduces manual labor, and ensures accurate measurements.

The subject matter disclosed and claimed herein, in one embodiment thereof, comprises an automated floor planning and installation system. The system includes an unmanned robot device designed to move along a floor or surface, outline and measure flooring, and detect obstacles, the robot device includes a sensor system to measure flooring surfaces and detect obstacles, a blade system disposed at the bottom of the robot device and designed to extend from a retracted position for cutting a flooring material, a remote floor planning control system in communication with the robot device via a communication channel, the floor planning control system has a floor planning module, and the floor planning module is configured for outlining the flooring area, tracing the perimeter, and indicating boundaries within which the flooring can be installed based on the sensor data received from the robot device.

In this manner, the automated floor planning and installation system of the present invention accomplishes all of the forgoing objectives and provides users with an automated measurement and cutting system for flooring. The system allows users to place a robot device in a room and utilize the sensors and computer system to take precise measurements of the floor and all permanent objects/fixtures/obstacles. The system eliminates the need to get on hands and knees to map out an entire floor plan.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an automated floor planning and installation system. The system further comprising an automated robot floor cutting device configured to move along a floor or surface, outline and measure flooring, and detect obstacles, the robot device having a sensor system integrated into the robot device to measure flooring surfaces and detect fixtures and obstacles, a floor planning control system in communication with the robot device via a communication channel, the floor planning control system comprising a floor planning module and a recommendation module, a blade system disposed at the bottom of the robot device and designed to extend from a retracted position for cutting a flooring material, the floor planning module is configured for outlining the flooring area, tracing the perimeter, and indicating boundaries within which the flooring can be installed based on the sensor data received from the robot device, and the recommendation module for generating recommendations for one or more flooring materials based on the floor plan and dimensions measured by the floor planning module.

In a further embodiment, the sensor system comprises a plurality of sensors for accurately measuring flooring surfaces, dimensions, shapes, irregularities, and detecting obstacles and items affixed to the floor or extending through the floor.

In a further embodiment, the blade system is automatically or remotely activated based on instructions from the floor planning control system or a push button on the robot device, facilitating accurate cutting of the flooring material as per the floor plan.

In yet another embodiment, an internal memory within the robot device stores the flooring plan, enabling autonomous movement and operation of the blade system based on the stored floor plan.

In yet another embodiment, the sensor system includes one or more laser distance sensors, one or more infrared (IR) sensors, one or more digital imaging sensors, and one or more tactile sensors.

In a further embodiment, the tactile sensors detect the smoothness or irregularities of the floor surface, contributing to accurate measurements for floor planning.

In yet another embodiment, an unmanned automated robot device for measuring, scanning, and cutting flooring materials within an automated flooring planning and installation system is disclosed. The robot device features one or more wheels or rails enabling autonomous movement of the robot device along a floor without external assistance, an integrated motor providing power for the movement of the robot device, allowing 360-degree rotation, a blade opening disposed at the bottom surface thereof, facilitating extension of a blade system for cutting flooring materials upon input from a remote floor planning control system, a sensor system positioned along the robot device to scan the surroundings, comprising laser detection sensors, infrared sensors, digital imaging sensors, and tactile sensors, and a processor within the robot device configured to receive sensor data, transmit the data to the floor planning control system for processing, and controlling the operation of the robot device.

In a further embodiment, a method for automated flooring planning and installation using a robot device is described. The method comprising the steps of utilizing sensors, including laser distance sensors, infrared sensors, and/or camera sensors, to measure floor surfaces and detect obstacles/fixtures, transmitting the sensor data collected by the robot device to a floor planning computer system for processing and analysis through wired or wireless communication methods, processing the sensor data by the floor planning computer system to create a detailed floor plan, including dimensions, shapes, boundaries, and obstacle locations, storing the generated floor plan in the internal memory of the robot device for easy access and reference during the installation process, and moving the robot device along the cutting guidelines specified in the floor plan generated by the computer system and activating the blade system at the appropriate positions to make accurate cuts in the flooring material.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
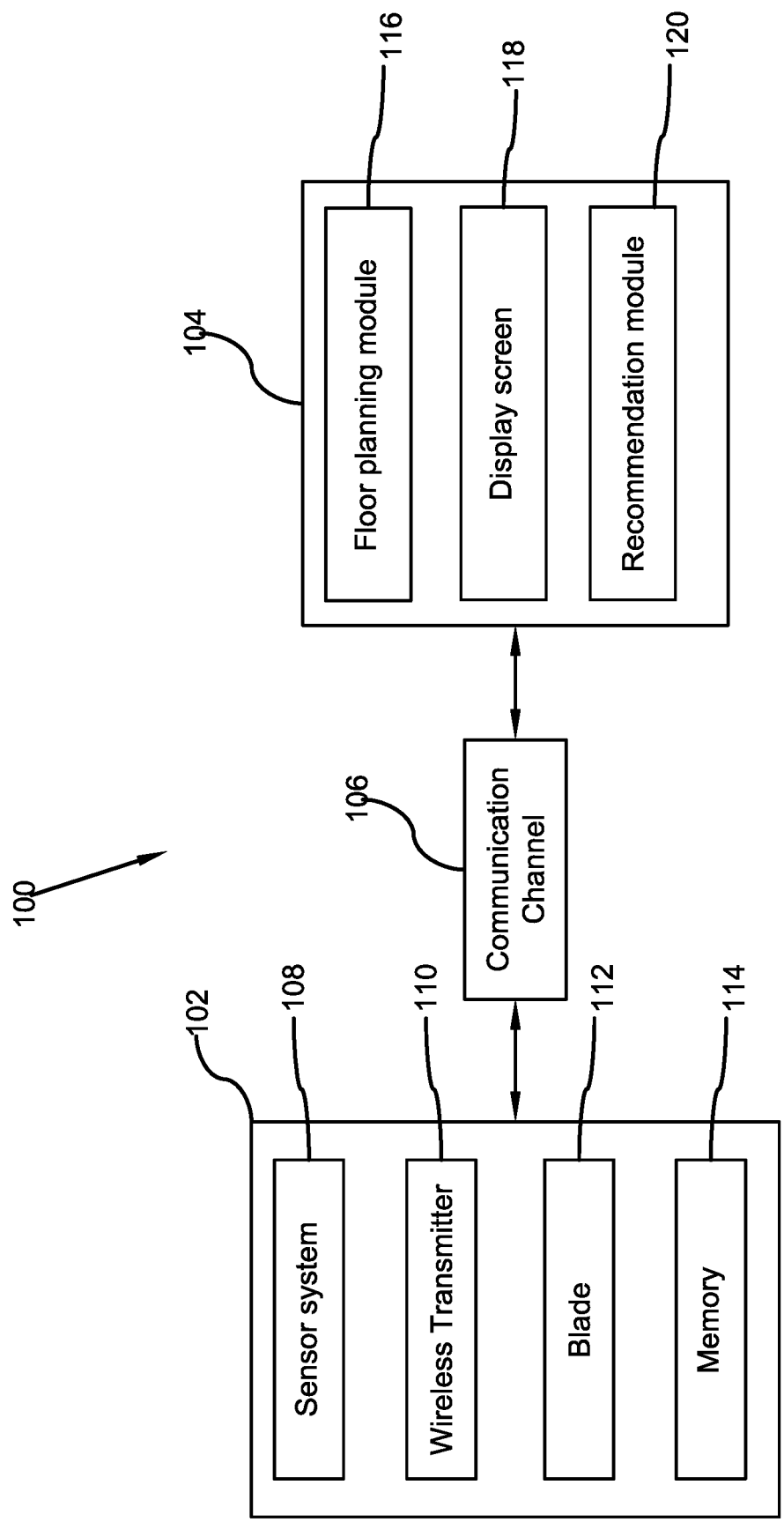
FIG. 1 illustrates a schematic view of an automated flooring planning and installation system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an automated measurement and cutting system for flooring. Additionally, there is a long felt need in the art for an automated floor planning system that eliminates the need for people to bend, get on hands and knees to manually map out an entire floor plan. Moreover, there is a long felt need in the art for a flooring planning system that uses a robot device for measuring a floor, obstacles, and fixtures. Further, there is a long felt need in the art of a system that saves considerable time, money, and effort when installing flooring. Finally, there is a long felt need in the art for an innovative automated system that streamlines the flooring installation process, reduces manual labor, and ensures accurate measurements.

The present invention, in one exemplary embodiment, is a method for automated flooring planning and installation using a robot or autonomous device. The method includes the steps of utilizing sensors, including laser distance sensors, infrared sensors, and/or camera sensors, to measure floor surfaces and detect obstacles/fixtures, transmitting the sensor data collected by the robot device to a floor planning computer system for processing and analyzing through wired or wireless communication methods, processing the sensor data by the floor planning computer system to create a detailed floor plan, including dimensions, shape, boundaries, and obstacle locations, storing the generated floor plan in the internal memory of the robot device for easy access and reference during the installation process, and moving the robot device along the cutting guidelines specified in the floor plan generated by the computer system and activating the blade system at the appropriate positions to make accurate cuts in the flooring material.

Referring initially to the drawings, FIG. 1 illustrates a schematic view of an automated flooring planning and installation system of the present invention in accordance with the disclosed architecture. The automated flooring planning and installation system 100 of the present invention is configured to provide users with an automated measurement and cutting system for flooring, thereby saving considerable time and effort when installing flooring. More specifically, the system 100 includes an automated robot or autonomous floor cutting device 102 and a floor planning control system 104 wherein the robot device 102 and the floor planning control system 104 communicate via a communication channel or device 106. The communication channel or device 106 can be a wired or a wireless connection depending on design and configuration of the system 100.

Figure 2:
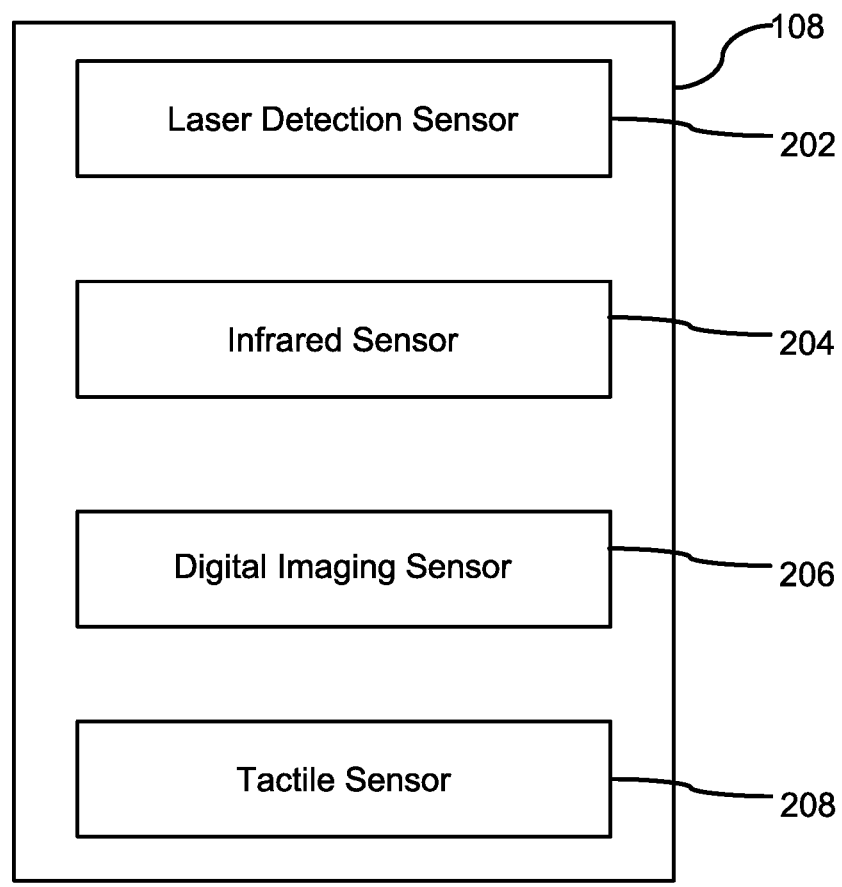
FIG. 2 illustrates a block diagram depicting different sensors integrated in the automated robot device of the automated flooring planning and installation system of the present invention in accordance with the disclosed architecture.

The automated robot device 102 is designed to move along a floor or surface and can outline and measure flooring, obstacles, fixtures, and more. The robot device 102 includes a sensor system or device 108 which has a plurality of sensors as illustrated in FIG. 2. The sensor system or device 108 is integrated into the robot device 102 and is designed to measure a flooring surface for providing accurate information about a floor's dimensions, shapes, fixtures, obstacles, and irregularities. Further, the robot device 102 also detects obstacles and items placed or affixed on the floor, thus, helping in creating an effective floor plan. In the preferred embodiment, the sensor data from the sensor system or device 108 is transmitted to the floor planning control system 104 for creating an automated and customized floor plan. The transmission can be done via the communication channel or device 106 using the wireless transceiver 110.

Figure 3:
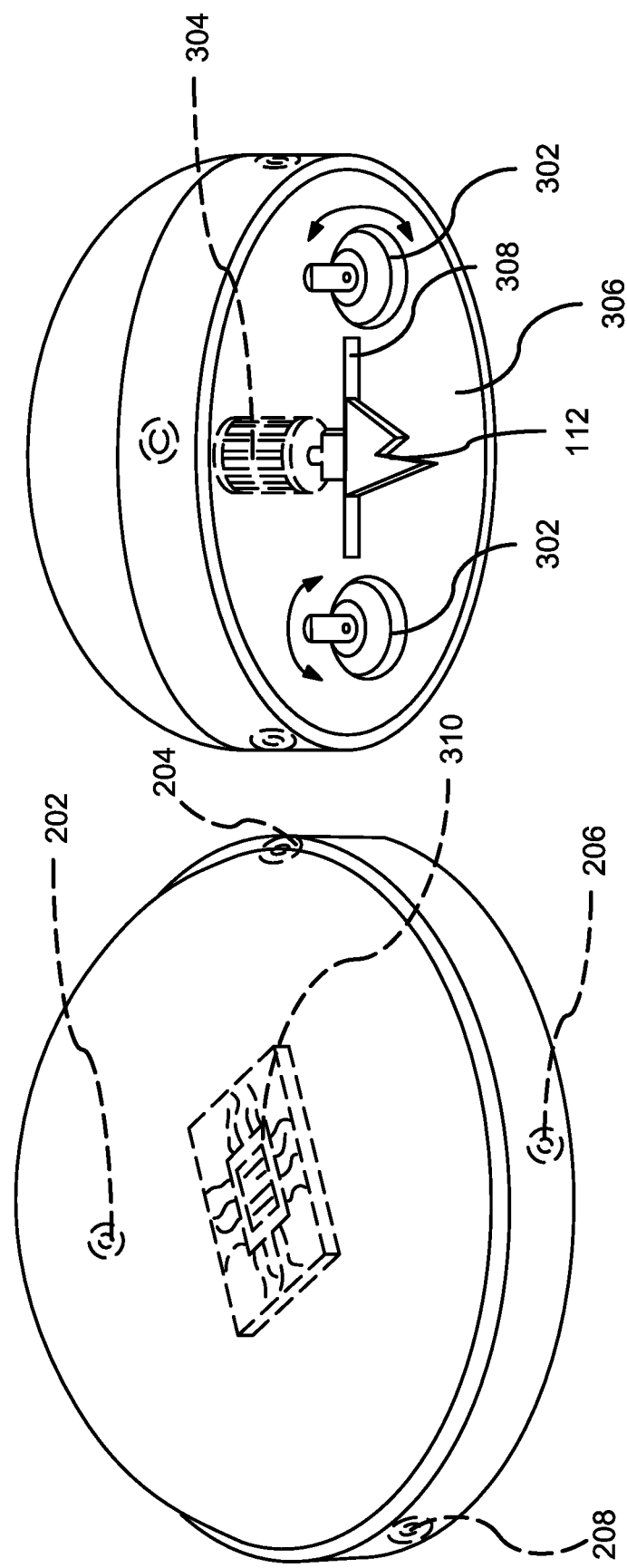
FIGS. 3A and 3B illustrate top perspective view and bottom perspective view of one potential embodiment of the automated robot device of the present invention in accordance with the disclosed architecture.

The robot device 102 is not only designed for measuring floor and detecting obstacles, but can also autonomously cut flooring material as per the floor plan designed and measured by the floor planning control system 104. A blade system 112 is disposed at the bottom of the robot device 102 as illustrated in FIG. 3B and is designed to extend from a retracted position for cutting a flooring material. The blade system 112 is automatically or remotely activated upon an instruction from the floor planning control system 104 or from a push button positioned on the robot device 102 as illustrated in FIGS. 3A and 3B. The floor plan designed by the floor planning control system 104 is transmitted to the robot device 102 enabling the robot device 102 to autonomously cut a flooring material. Furthermore, an internal memory 114 of the robot device 102 stores the flooring plan and uses for the movement and operation of the blade system 112.

The floor planning control system 104 includes a floor planning module 116 designed to outline a flooring plan based on the sensor data received from the robot device 102. In some embodiments, the floor planning module 116 outlines the flooring area on the floor plan. Further, the floor planning module 116 can trace the perimeter of the measured space, indicating the boundaries within which the flooring can be installed. The floor plan also considers the fixtures, furniture, structures, obstacles, and the like and helps in precise floor plan without much wastage. The floor plan created by the floor planning module 116 is displayed on a touch display screen 118 of the floor planning control system 104. The display screen 118 also allows a user to adjust or make modifications in the floor plan as per their preferences.

Based on the floor plan and dimensions measured by the floor planning module 116, a recommendation module 120 recommends one or more flooring materials for flooring. The flooring material can be also customized as per the material of the blade system 112 of the robot device 102.

FIG. 2 illustrates a block diagram depicting different sensors integrated in the automated robot device of the automated flooring planning and installation system of the present invention in accordance with the disclosed architecture. The sensor system or device 108 can be designed as an Integrated chip (IC) or SoC and integrated within the robot device 102. Further, the sensor system or device 108 includes a plurality of sensors including a laser distance sensor 202. The laser distance sensor 202 is configured to emit a laser beam and measure the time taken by the beam to reflect back to the sensor 202. Using the time and the speed of laser, the sensor 202 can accurately determine the distance between the sensor and the floor surface and/or one or more fixtures, providing precise measurements of the flooring dimensions.

The sensor system or device 108 includes one or more infrared (IR) sensors 204 that are used for detecting objects and obstacles in the vicinity of the robot system 102. The IR sensors 204 emit and detect infrared radiation and can be positioned strategically on the robot device 102 to detect permanent objects like walls, furniture, or fixtures. The IR sensors 204 can be positioned to cover 360 degrees around the robot device 102. One or more digital imaging sensors 206 such as digital cameras or depth cameras are included in the sensor system 102 and are configured to capture visual data of the floor surface. One or more computer vision algorithms can be implemented in the sensors 206 for analyzing the images to measure the dimensions, detect patterns, and identify any irregularities or obstacles. In some embodiments, the floor planning module 116 implements the computer vision algorithms for identifying irregularities and obstacles. Digital imaging sensors 206 provide detailed visual information that can be used to create an accurate floor plan.

The sensor system or device 108 also includes one or more tactile sensors 208, such as force-sensitive resistors, and are configured to detect variations in pressure or contact with the floor surface on which the robot device 102 is moving. The sensors 208 detects the smoothness or irregularities of the floor and provide additional data for accurate measurements for floor planning by the system 100.

FIGS. 3A and 3B illustrate top perspective view and bottom perspective view of one potential embodiment of the automated robot device of the present invention in accordance with the disclosed architecture. The automated robot device 102 is unmanned and is used for measuring and scanning floor size and other fixtures and obstacles. More specifically, the robot device 102 has one or more wheels or rails 302 for moving along a floor without any external help. An integrated motor 304 provides power for movement of the robot device 102 and the robot device 102 can move 360 degrees. At the bottom surface 306 of the robot device 102, a blade opening 308 is disposed which is used for extending the blade system 112 for cutting a flooring material. The blade system 112 can selectively extend outward based on an input from the floor planning control system 104.

The sensor system or device 108 including the sensors as illustrated in FIG. 2 are disposed along the robot device 102, thereby scanning 360 degrees around thereof. Laser detection sensors 202, infrared sensors 204, and/or digital imaging sensors 206 are positioned along the periphery of the robot device 102 and the tactile sensors 208 are positioned on the bottom surface 306 of the robot device 102. The robot device 102 has a processor 310 configured for receiving data from the sensors and transmitting to the floor planning control system 104 for processing. The processor 310 can be any microcontroller or microprocessor and control operation of the robot device 102.

The robot device 102 can be constructed using lightweight and durable materials such as aluminum alloys, carbon fiber composites, or high-strength plastics, offering a good balance between weight, strength, and maneuverability. The specific dimensions of the robot device 102 can depend on factors such as the targeted flooring installation area and the size of the flooring materials. In some embodiments of the present invention, the robot device 102 can feature a robotic arm extending from the bottom surface 306 for precise movements and adjustments during cutting and installation.

Figure 4:
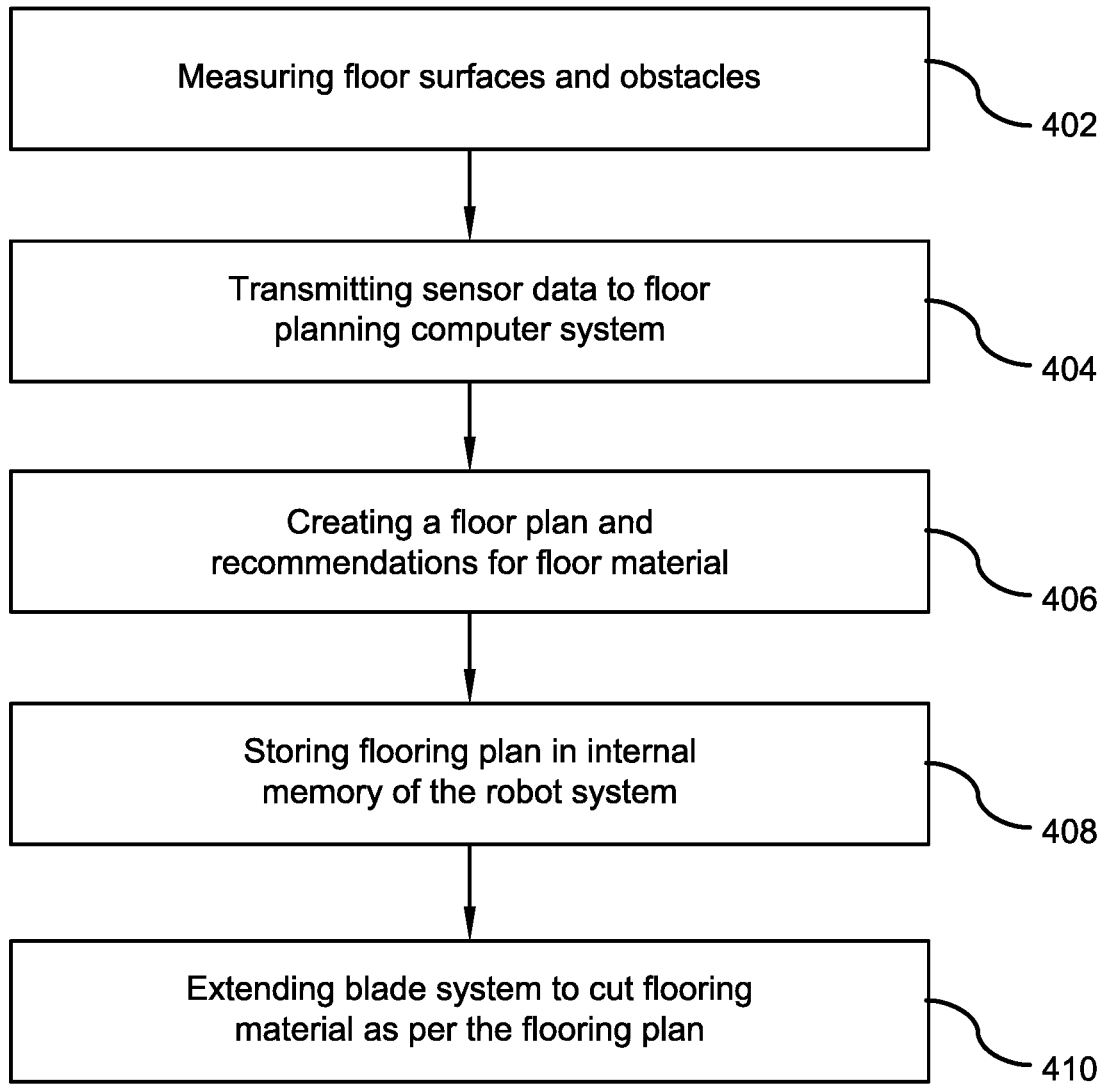
FIG. 4 illustrates a flow diagram depicting the process of measuring a floor layout and preparing a floor plan using the floor planning system of the present invention in accordance with the disclosed architecture.

FIG. 4 illustrates a flow diagram depicting the process of measuring the floor and preparing a floor plan using the floor planning system of the present invention in accordance with the disclosed architecture. Initially, the robot or autonomous device 102 utilizes sensors, such as laser distance sensors, infrared sensors, and/or camera sensors, to measure floor surfaces and detect obstacles. For measuring floor surfaces, the sensors emit signals or capture images that are processed to determine dimensions, irregularities, slopes, and other relevant parameters of the floor. In the case of detecting obstacles, the sensors analyze the surroundings to identify permanent objects like walls, furniture, or fixtures (Step 402).

Then, the sensor data collected by the robot system 102 is transmitted to the floor planning computer system 104 for processing and analysis (Step 404). This transmission can occur through wired or wireless communication methods, depending on the specific design and connectivity options of the device 102. The sensor data is sent in real-time or periodically to the computer system 104, where the data is received and interpreted by software algorithms specifically designed for floor planning.

In step 406, the floor planning computer system 104 processes the data to create a detailed floor plan. The floor plan can include dimensions, shapes, boundaries, and the location of obstacles detected by the sensors. The computer system 104 can also provide recommendations for suitable floor materials based on the characteristics of the floor surface, user preferences, and other factors. These recommendations can include suggestions for the type of flooring material, thickness, color, pattern, or any special requirements.

In step 408, for ensuring easy access and reference during the installation process, the floor plan generated by the computer system 104 can be stored in the internal memory of the robot device 102. This allows the robot 102 to have immediate access to the floor plan without relying solely on the continuous connection with the computer system 104. Storing the floor plan locally in the robot system's memory also ensures that the installation can proceed smoothly even if there are temporary disruptions in communication with the computer.

Finally, in step 410, the robot system 102 precisely moves along the cutting guidelines specified in the floor plan generated by the computer system 104. The blade system 112 is automatically or remotely activated at the appropriate positions to make accurate cuts in the flooring material, following the dimensions and shapes outlined in the floor plan. This automated cutting process cuts the flooring material to the correct size, minimizing errors and reducing the time and effort required for manual cutting.

Figure 5:
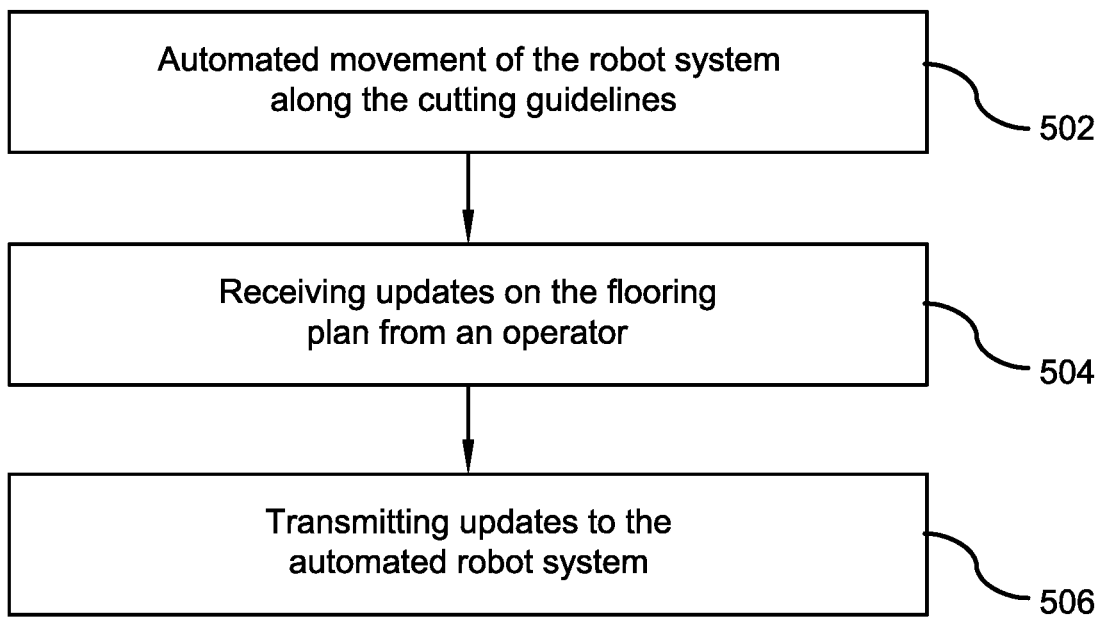
FIG. 5 illustrates a flow diagram depicting a process of using an updated floor plan by the robot device in accordance with the disclosed architecture.

FIG. 5 illustrates a flow diagram depicting a process of using an updated floor plan by the robot device in accordance with the disclosed architecture. Once the floor plan is generated and the cutting guidelines are established by the computer system 104, the robot device 102 autonomously moves along the cutting guidelines to cut the flooring material accurately (Step 502). As described above, the robot device 102 utilizes motorized wheels or tracks to navigate along the predetermined path, ensuring that the cutting guidelines are followed with precision. During the flooring installation process, an operator or user can adjust or update the original floor plan using the computer system (Step 504). For example, the user may encounter unexpected obstacles, variations in the floor surface, or changes in the desired flooring layout. In such cases, the operator can interact with the computer system 104 to provide updates to the floor plan. This can be done through a user-friendly interface where the operator can input modifications or mark changes directly on the floor plan displayed on the computer system 104. The operator's inputs are processed by the computer system 104 to update the floor plan accordingly.

In step 506, the computer system 104 transmits the updated floor plan data to the robot system 102 in real-time or periodically, depending on the specific communication protocol and connectivity options of the device 102. The robot system 102 upon receiving the updated floor plan, adjusts the movements and cutting operations accordingly.

Figure 6:
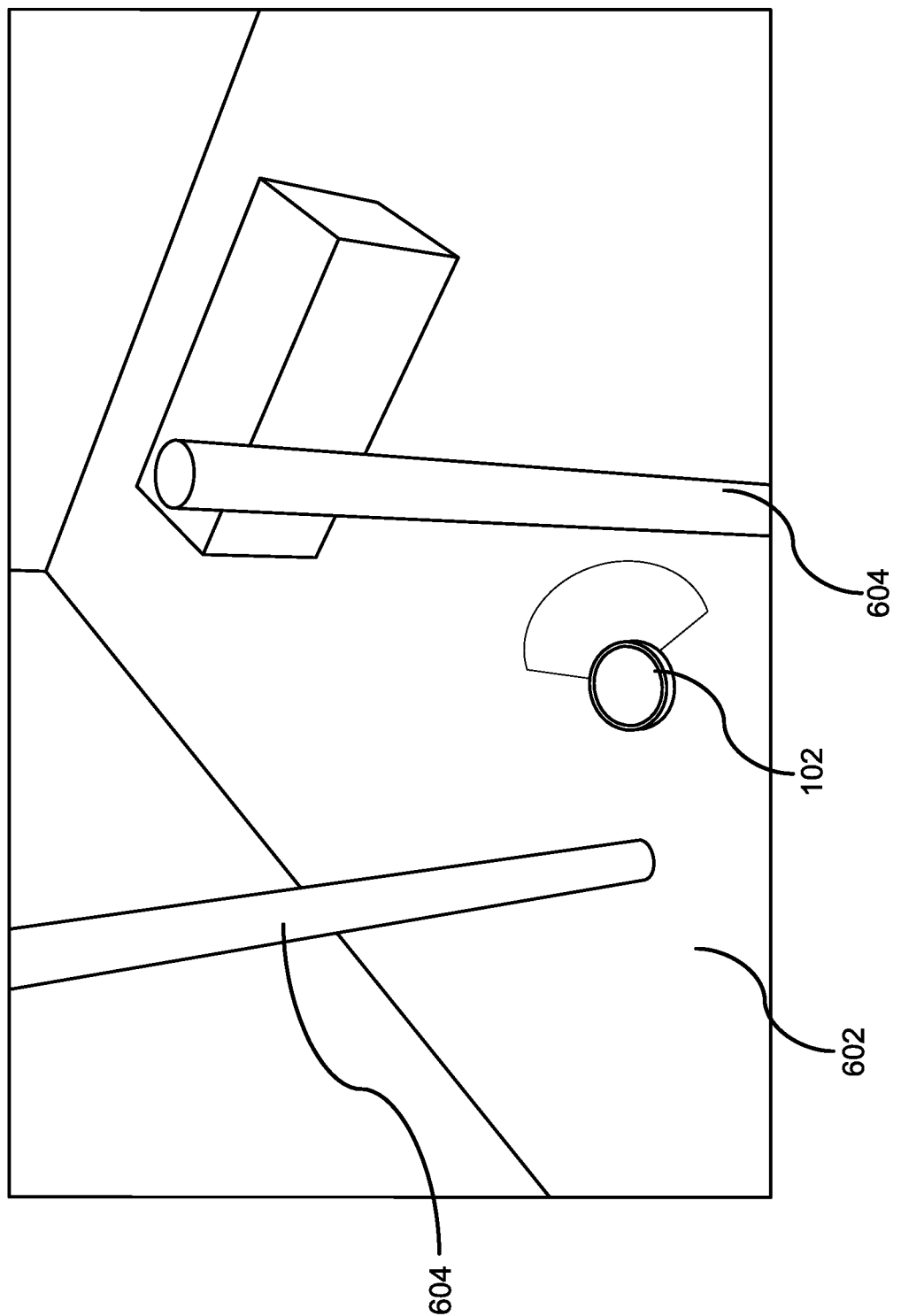
FIG. 6 illustrates a perspective view showing the robot device positioned in an enclosed space for scanning and measurement in accordance with the disclosed architecture.

FIG. 6 illustrates a perspective view showing the robot device 102 positioned in an enclosed space for scanning and measurement in accordance with the disclosed architecture. The robot device 102 is placed on a floor 602 which is required to be measured and on which flooring is to be installed. Obstacles 604 are scanned and identified by the device 102 as described in the disclosure earlier.

Figure 7:
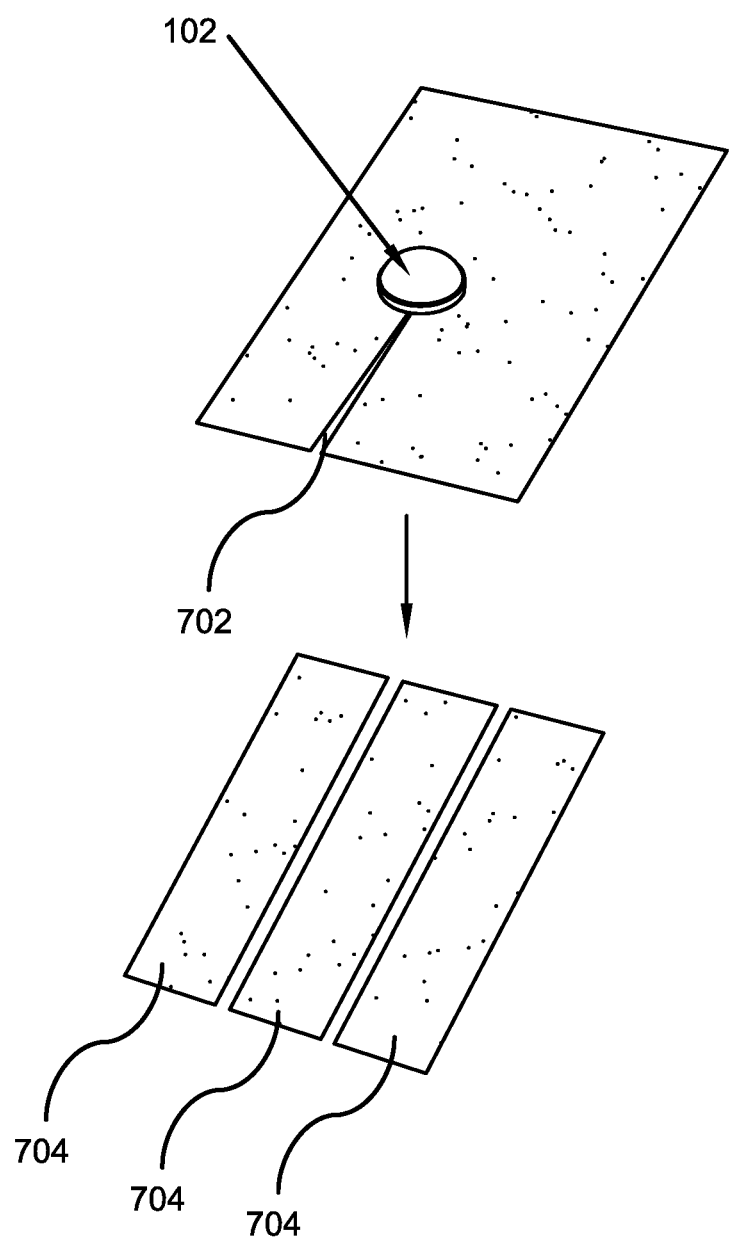
FIG. 7 illustrates a perspective view showing the robot device cutting the flooring into different cutouts in accordance with the disclosed architecture.

FIG. 7 illustrates a perspective view showing the robot device 102 cutting the flooring into different cutouts in accordance with the disclosed architecture. The robot device 102 precisely moves along the cutting guidelines 702 specified in the floor plan generated by the computer system 104. The blade system 112 shown in FIG. 3B is automatically or remotely activated at the appropriate positions to make accurate cuts in the flooring material, following the dimensions and shapes outlined in the floor plan to make a plurality of cutouts 704.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "automated flooring planning and installation system", "floor planning system", and "system" are interchangeable and refer to the automated flooring planning and installation system 100 of the present invention. Similarly, as used herein "robot device", "robot system", "automated robot device", and "device" are interchangeable and refer to the automated robot device 102 of the present invention.

Notwithstanding the forgoing, the automated flooring planning and installation system 100 and the automated robot device 102 of the present invention can be of any suitable size and configuration as is known in the art without affecting the overall concept of the invention, provided that it accomplishes the above stated objectives. One of ordinary skill in the art will appreciate that the automated flooring planning and installation system 100 and the automated robot device 102 as shown in the FIGS. are for illustrative purposes only, and that many other sizes and shapes of the automated flooring planning and installation system 100 and the automated robot device 102 are well within the scope of the present disclosure. Although the dimensions of the automated flooring planning and installation system 100 and the automated robot device 102 are important design parameters for user convenience, the automated flooring planning and installation system 100 and the automated robot device 102 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous floor planning and floor cutting device comprising:
    an autonomous device including a communication device and a sensor device;
    wherein said autonomous device having a plurality of wheels on a bottom surface;
    wherein said sensor device integrated in said autonomous device and having a plurality of sensors for measuring a flooring surface and compiling sensor data including flooring dimensions, flooring shapes, flooring fixtures, and flooring obstacles;
    wherein said plurality of sensors are selected from a group of sensors consisting of a laser detection sensor, an infrared sensor, a digital imaging sensor, and a tactile sensor;
    wherein said autonomous device moves along a flooring surface with said plurality of wheels;
    wherein said sensor data is used to create a customized floor plan; and
    wherein the autonomous device further comprises a blade that is extendable and retractable from the bottom surface and is remotely operable.

2. An autonomous floor planning and floor cutting device of claim 1, wherein said measuring having an outline of the flooring surface, said flooring shapes, said flooring fixtures, and said flooring obstacles.

3. An autonomous floor planning and floor cutting device of claim 2, wherein said communication device is wireless.

4. An autonomous floor planning and floor cutting device of claim 3, wherein said autonomous device having a non-transitory internal memory for storing said customized floor plan.

5. A method of customizing a floor plan and cutting the floor plan, the method comprising the steps of:
    providing an autonomous device including a communication device and a sensor device;
    wherein said autonomous device having a plurality of rails on a bottom surface for moving the autonomous device across a flooring surface;
    wherein said sensor device integrated in said autonomous device and having a plurality of sensors;
    wherein said plurality of sensors comprise a laser distance sensor, a plurality of infrared sensors positioned on the autonomous device to cover 260 degrees, a digital imaging sensor, and a force sensitive resistor;
    moving said autonomous device along the flooring surface with said plurality of rails;
    measuring the flooring surface and compiling sensor data including flooring dimensions, flooring shapes, flooring fixtures, and flooring obstacles; and
    creating a customized floor plan with said sensor data; and
    wherein the autonomous device further comprises a blade that is extendable and retractable from the bottom surface and is remotely operable.

6. The method of customizing a floor plan and cutting the floor plan of claim 5, wherein said measuring having an outline of the flooring surface, said flooring shapes, said flooring fixtures, and said flooring obstacles.

7. The method of customizing a floor plan and cutting the floor plan of claim 6, wherein said communication device is wireless.

8. The method of customizing a floor plan and cutting the floor plan of claim 7, wherein said autonomous device having an internal memory for storing said customized floor plan.

9. A method of customizing a floor plan, the method comprising the steps of:
    providing an autonomous device including a communication device and a sensor device;
    wherein said sensor device integrated in said autonomous device and having a plurality of sensors;
    wherein said plurality of sensors comprise a laser distance sensor, a plurality of infrared sensors positioned on the autonomous device to cover 260 degrees, a digital imaging sensor, and a force sensitive resistor;
    moving said autonomous device along a flooring surface;

measuring a flooring surface and compiling sensor data including flooring dimensions, flooring shapes, flooring fixtures, and flooring obstacles; and creating a customized floor plan with said sensor data; and wherein the autonomous device further comprises a blade that is extendable and retractable from the bottom surface and is remotely operable.

10. The method of customizing a floor plan of claim 9, wherein said measuring having an outline of the flooring surface, said flooring shapes, said flooring fixtures, and said flooring obstacles.

11. The method of customizing a floor plan of claim 10, wherein said autonomous device having a plurality of wheels on a bottom surface for said moving of said autonomous device.

12. The method of customizing a floor plan of claim 11, wherein said communication device is wireless.

13. The method of customizing a floor plan of claim 12, wherein said autonomous device having an internal memory for storing said customized floor plan.

* * * * *